United States Patent [19]

Senoo

[11] Patent Number: 4,585,339

[45] Date of Patent: Apr. 29, 1986

[54] POWER CONTROL OF ELECTRONIC APPARATUS IN RESPONSE TO SURROUNDING BRIGHTNESS

[75] Inventor: Yoji Senoo, Yamatokoriyama, Japan

[73] Assignee: Sharp Kabushiki Kaisha, Osaka, Japan

[21] Appl. No.: 674,007

[22] Filed: Nov. 23, 1984

[30] Foreign Application Priority Data

Nov. 28, 1983 [JP] Japan .......................... 58-183984[U]

[51] Int. Cl.⁴ ...................... H01H 47/24; G03B 27/72

[52] U.S. Cl. ...................................... 355/69; 307/117; 250/214 AL

[58] Field of Search .............................. 355/69, 14 R; 250/214 AL; 307/117, 140, 141; 361/175; 340/555

[56] References Cited

U.S. PATENT DOCUMENTS

| | | | |
|---|---|---|---|
| 3,529,214 | 9/1970 | Corn | 307/117 |
| 3,961,183 | 6/1976 | Dubot et al. | 307/117 X |
| 4,139,802 | 2/1979 | Dubot et al. | 250/214 AL X |
| 4,198,563 | 4/1980 | Elssner | 250/214 AL X |
| 4,449,074 | 5/1984 | Luchaco | 250/214 AL X |

*Primary Examiner*—L. T. Hix

*Assistant Examiner*—Della Rutledge

*Attorney, Agent, or Firm*—Birch, Stewart, Kolasch & Birch

[57] ABSTRACT

A power controller for an electronic apparatus including an electrophotographic copying machine is provided for automatically prohibiting power supply to parts of the apparatus in response to the reduction of a light-shining amount, e.g., a decrease in the light surrounding the apparatus. The power controller includes a photosensitive element, a comparator, a delay circuit, a gate, and a relay. The photosensitive element serves to provide a voltage in accordance with the surrounding brightness.

5 Claims, 3 Drawing Figures

POWER CONTROL OF ELECTRONIC APPARATUS IN RESPONSE TO SURROUNDING BRIGHTNESS

BACKGROUND OF THE INVENTION

The present invention relates to an electronic apparatus including an electrophotographic copying machine and, more particularly, to a power control means of an electronic apparatus including an electrophotographic copying machine in response to surrounding brightness.

A conventional electronic apparatus including an electrophotographic copying machine is equipped with no means for automatically switching off the machine in response to a decrease in the surrounding brightness. For example, once the copying machine is powered, some members such as its fixing roller are being powered to await a possible copying operation unless its power-off switch is actuated. That is, it may be impossible to automatically switch off the machine and save power as far as the power-off switch is not actuated even in the condition that there will be no possibility of operating the machine, for example, when it becomes darker at the office because the person has been out of the office and switched off the office lights, but forgotten to switch off the machine.

SUMMARY OF THE INVENTION

Accordingly, it is an object of the present invention to provide an improved electronic apparatus for responding to its surrounding brightness.

It is another object of the present invention to provide an improved power control means for an electrophotographic copying machine for switching off the machine in response to its surrounding brightness.

It is a further object of the present invention to provide an improved power control means for an electrophotographic copying machine and automatically preventing its main power consumers from being powered so as to save power.

Briefly described, in accordance with the present invention, power control means for an electronic apparatus including an electrophotographic copying machine comprises power supply means for supplying power to the apparatus, photosensitive means for detecting the reduction of a light-shining amount to the apparatus, comparator means for detecting whether the light-shining amount is smaller than a set value, and relay means responsive to the comparator means for prohibiting power supply to the apparatus. Reference voltage supply means is provided for supplying a reference voltage to the comparator means. Delay means is provided for delaying the output of the comparator means by several seconds.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

It should be noted that the application of the present invention is not limited to an electrophotographic copying machine although the preferred embodiment of the present invention is explained hereinbelow in terms of such a copying machine.

Figure 1:
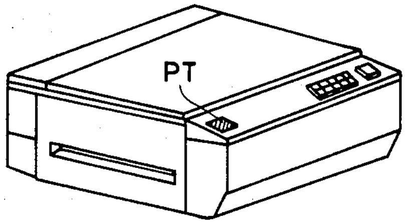
FIG. 1 is a perspective view of an electrophotographic copying machine including a power control means according to the present invention.
Figure 2:
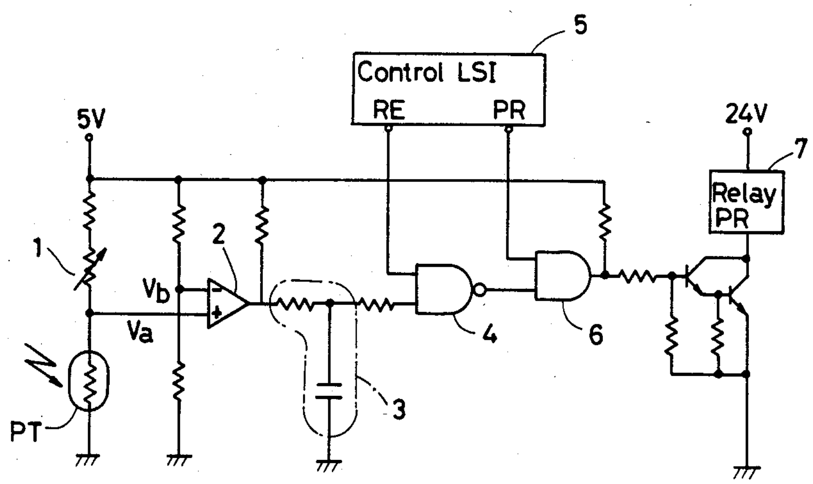
FIG. 2 is a circuit diagram of the power control means.

FIG. 1 is a perspective view of an electrophotographic copying machine including a power control means according to the present invention. FIG. 2 is a circuit diagram of the power control means.

Referring to FIG. 1, the copying machine comprises a plurality of manual switches on the right side on a control unit and a light receiving face of a photo-detector PT at the left side of the unit. The photo-detector PT is made of a photoconductive material such as CdS or other suitable material.

Referring to FIG. 2, the photo-detector PT is electrically coupled to the power control circuit of the present invention. The power control circuit comprises a variable resistance 1, a comparator 2, an RC delay circuit 3, an NAND gate 4, a control large scale integrated circuit (LSI) 5, an AND gate 6, and a PR relay 7.

The photo-detector PT is connected to the variable resistance 1 so that a photovoltage of the detector PT may be divided. The connection between the detector PT and the resistance 1 is electrically coupled to a non-reverse input terminal of the comparator 2. A reference voltage Vb is applied to a reverse input terminal of the comparator 2. The resistance 1 is provided for adjusting the value of the voltage Va to be applied to the non-reverse input terminal of the comparator 2 by varying its resistance so that the sensitivity of the photo-detector PT can be actually controlled. A variable switch for controlling the value of the variable resistance 1 may be secured at an appropriate position of the copying machine although not shown in FIG. 1.

The output of the comparator 2 is applied to a first input terminal of the NAND gate 4 via the RC delay circuit 3. The RC delay circuit 3 is provided for delaying signals to be applied to the first terminal of the NAND gate 4 for several seconds. The length of the delayed seconds should be selected based on a value of a resistance R and a capacitance of a condensor C. An RE terminal of the control LSI 5 is coupled to a second input terminal of the NAND gate 4. The output of the NAND gate 4 is entered to a first input terminal of the AND gate 6 whose second input terminal is coupled to a PR terminal of the control LSI 5. The output of the AND gate 6 controls activation of the PR relay 7 with a plurality of amplifying transistors.

Figure 3:
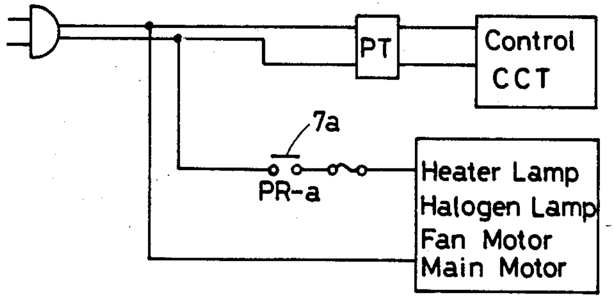
FIG. 3 is a block diagram of a circuit comprising power supply means, the power control means, and the main power consuming parts of the copying machine.

FIG. 3 is a block diagram of a power supply means, the PR relay 7, and parts of the copying machine. The power of these parts are to be controlled by the ON/OFF of the PR relay 7. The power supply means, including a commercial power source, a plug, and wires, is provided for supplying power to the copying machine. The power control means of FIG. 3 comprises the photo-detector PT, the PR relay 7 including a fixed point PR-a and a movable point 7a, a control circuit comprising the control LSI 5. The main power-consuming parts of the copying machine are a heater lamp, a halogen lamp, a fan motor, and a main motor. Even during the awaiting conditions for awaiting a possible copy, they consume a considerably large amount of power although the amount is less than during the copying conditions.

After the main power switch of the copying machine has been actuated and it is placed in the awaiting condition for a possible copy to promptly enable a copy in response to the actuation of a copy switch, the RE terminal of the control LSI 5 bears a high level signal "H". When the copying machine has been powered and is placed in the ready conditions for a possible copy prior to the awaiting conditions, the RE terminal of the control LSI 5 bears a low level signal "L". The PR terminal of the control LSI 5 is provided for outputting a PR control signal in synchronization with the ON/OFF conditions of the main power switch of the copying machine. That is, when the main power switch is turned ON, the PR terminal bears the high level signal "H", and when turned OFF, it bears the low level signal "L".

While the photo-detector PT can receive a light amount more than a set value, indicating that the copying machine is placed in a bright position, the resistance of the photo-detector PT is so low that a relation of $Va<Vb$ is satisfied. When $Va<Vb$, the output of the comparator 2 is "L". The light amount for providing the relation of $Va<Vb$ can be selected to some extent by the resistance of the variable resistance 1.

When the output of comparator 2 is "L", the output of NAND gate 4 is "H" regardless of whether a READY signal from the RE terminal of the control LSI 5 is "H" or "L". Once the output of the NAND gate 4 is "H", according to the output from the PR terminal of the control LSI 5, the PR relay 7 is turned ON/OFF. Therefore, when the photo-detector PT can receive a light amount more than that set by the variable resistance 1, the PR relay 7 is turned ON so that the movable point of the PR relay 7 is attached to the fixed point PR-a thereof. To the main parts of FIG. 2, power can be conducted so that the copying machine is placed in the awaiting conditions for copy.

When the photo-detector PT receives a light amount less than that set by the resistance 1, indicating that it is placed in the dark, whereby the resistance of the detector PT is increased, the input voltage of the comparator 2 shows a relation of $Va>Vb$. If the operation of the delay circuit 3 is neglected, the relation of $Va>Vb$ causes the output of the comparator 2 to be "H", whereby when the READY signal from the RE terminal of the control LSI 5 is "H", the output of the NAND gate 4 is "L". Hence, even when the PR control signal from the PR terminal of the control LSI 5 is "H", the output of the AND gate 6 is "L" so that the PR relay 7 is turned OFF. Thus, when the actuation of the main power switch to cause the power-off is forgotton, the reduction of a light-shining amount to the photodetector PT, at the time when the surrounding lights are turned off or so, enables the PR relay 7 to be automatically turned off so that the power supply to the main parts of the copying machine can be prevented.

It may be possible that the photo-detector PT is covered by a hand or a document or the like for a while. The delay circuit 3 is connected to the output of the comparator 2 for delaying the signals outputted by the comparator 2 for several seconds. As the hand or the document can be removed within these several seconds, the PR relay 7 is prevented from being turned off since the surrounding light is still bright.

In the above preferred embodiment of the present invention, it is described that the main power switch should respond to the light difference between noon and night so that it is automatically switched OFF at night even when a manual switching-off of the copying machine may be forgotton to be actuated. As far as the resistance of the variable resistance 1 can be varied, the photo-detector PT can respond to the reduction of the light-shining amount to the detector PT even during noon. Therefore, it may be responsive to the reduction of the light-shining amount from the ceiling for a rest time of the office.

While only certain embodiments of the present invention have been described, it will be apparent to those skilled in the art that various changes and modifications may be made therein without departing from the spirit and scope of the present invention as claimed.

What is claimed is:

1. Power control means in an electrophotographic copying machine, said power control means comprising:

- photodetector means, responsive to the intensity of ambient light impingent thereon, for supplying a control voltage to said power control means;
- means for supplying power to said copying machine;
- copy enabling means, responsive to said means for supplying power, for placing said copying machine in a ready mode;
- means for providing a reference voltage representative of a specific intensity of ambient light impinging on said photodetector means;
- comparator means for comparing said control voltage and said reference voltage and for providing an output signal representative thereof;
- means for delaying said output signal of said comparator means;
- first gate means, responsive to the output signal of said comparator means and said copy enabling means, for providing a first output signal;
- second gate means, responsive to the first output signal of said first gate means and said means for supplying power to said copying machine, for providing a second output signal; and
- relay means, responsive to said second output signal representative of said intensity of ambient light impinging on said photodetector, for automatically turning said copying machine ON or OFF.

2. The power control means according to claim 1, wherein said means for delaying said output is an RC delay circuit adjustable to delay said output by several seconds.

3. The power control means according to claim 1, wherein said first gate means is a NAND gate.

4. The power control means according to claim 1, wherein said second gate means is an AND gate.

5. The power control means of claim 1, wherein said power control means is adapted to save power to at least one of a plurality of main copying machine parts such as a heater lamp, a halogen lamp, a fan motor, and a primary motor.

* * * * *